Figure 2:
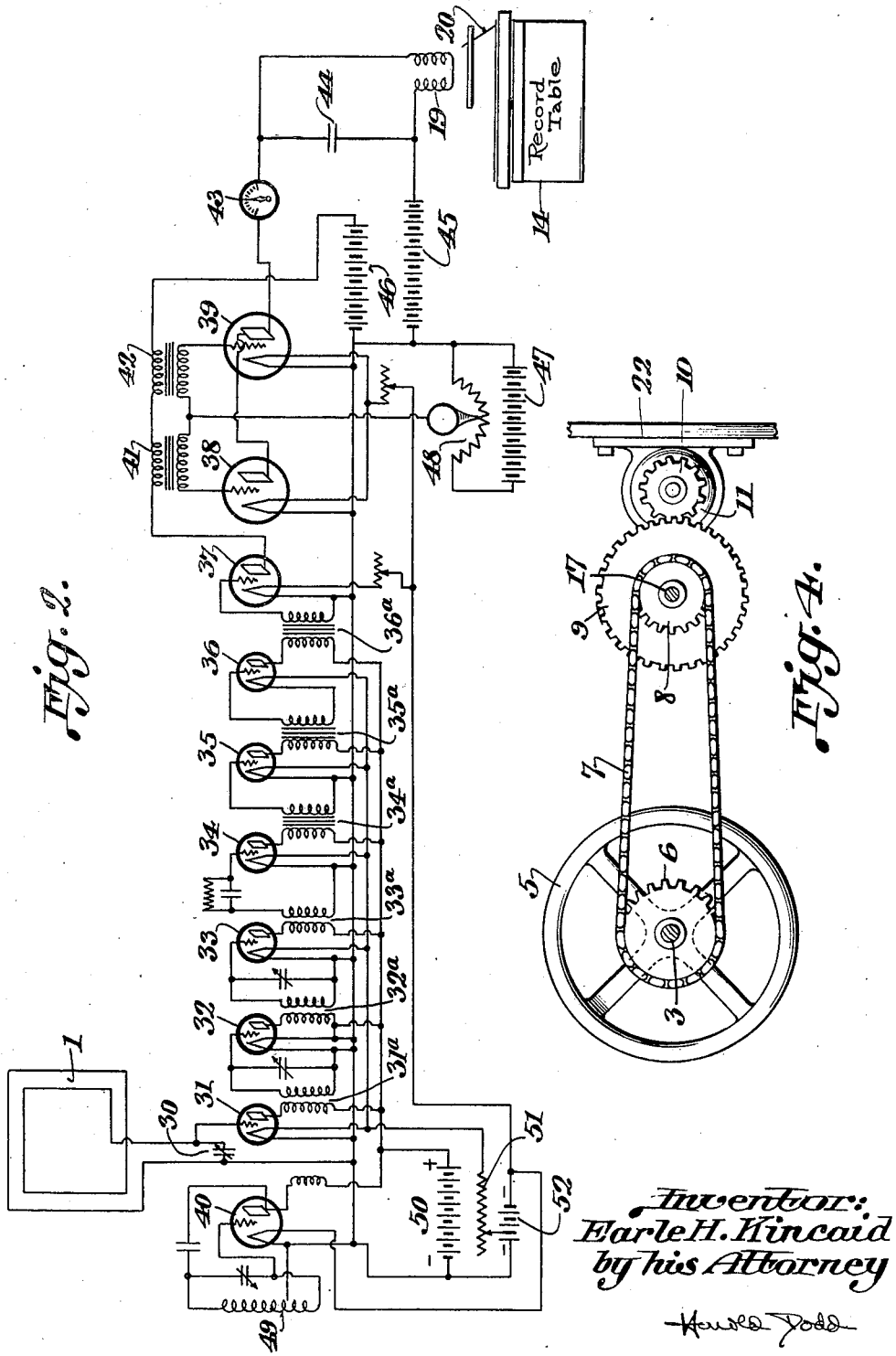

June 27, 1933.  E. H. KINCAID  1,915,321
METHOD OF AND MEANS FOR MAKING METEOROLOGICAL
OBSERVATIONS AND DETERMINATIONS
Filed Sept. 27, 1927  7 Sheets-Sheet 1

Fig. 1.

Inventor:
Earle H. Kincaid;
by his Attorney
Harold Dodd

June 27, 1933.  E. H. KINCAID  1,915,321
METHOD OF AND MEANS FOR MAKING METEOROLOGICAL
OBSERVATIONS AND DETERMINATIONS
Filed Sept. 27, 1927   7 Sheets-Sheet 3

Inventor:
Earle H. Kincaid;
by his Attorney
Harold Dodd

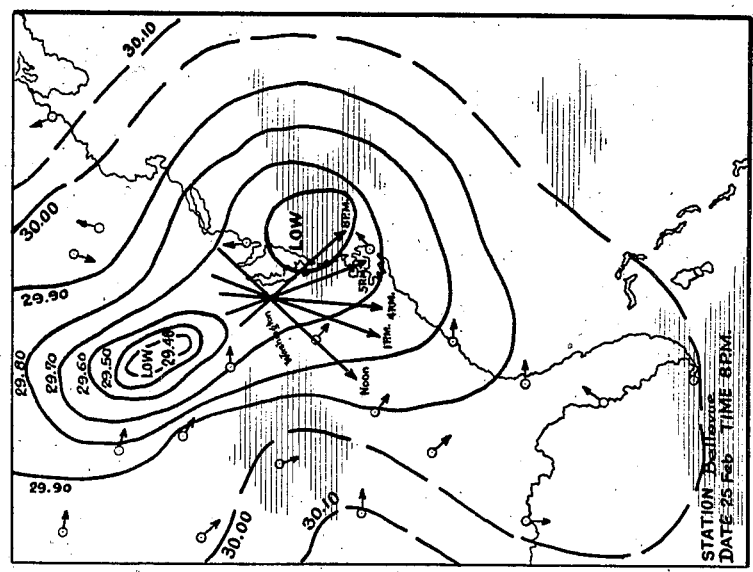
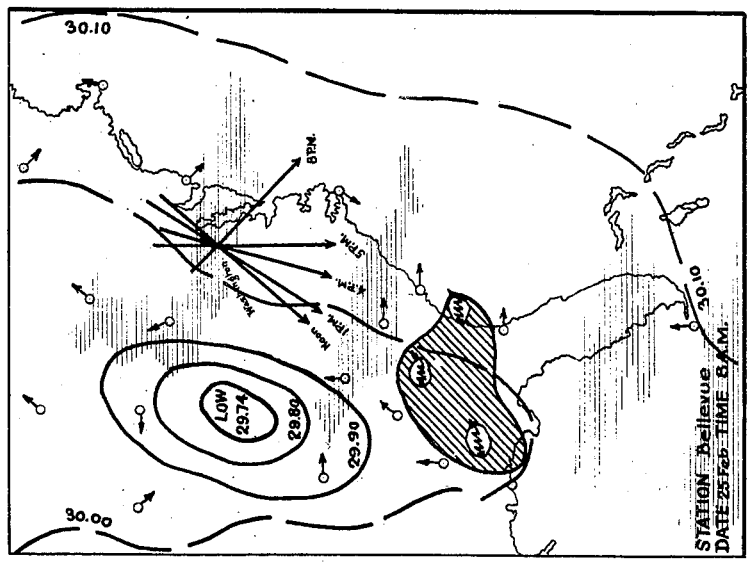

UNITED STATES PATENT OFFICE

EARLE H. KINCAID, OF WASHINGTON, DISTRICT OF COLUMBIA

METHOD OF AND MEANS FOR MAKING METEOROLOGICAL OBSERVATIONS AND DETERMINATIONS

Application filed September 27, 1927. Serial No. 222,361.

(GRANTED UNDER THE ACT OF MARCH 3, 1883, AS AMENDED APRIL 30, 1928; 370 O. G. 757)

My invention relates broadly to an improved method of and means for making meteorological observations and determinations, and which may be more specifically stated as a system for correlating static with changes in weather conditions and more particularly to an apparatus for recording static for the purpose of forecasting conditions of weather.

Heretofore the phenomenon of static has been properly and popularly termed the outlaw and intermeddler of the air.

Heretofore meteorological conditions of places have been determined by various instruments located at such place with technically trained and experienced personnel to care for and record data from such instruments which usually include means for ascertaining the direction and velocity of air currents, and a barometer.

Heretofore such conditions for the more or less immediate future of a given place or places have been determined through the practice of said personnel at other places artificially communicating to a place or places their said respective data obtained for a definite period. From said communications and the general knowledge of meteorology said future conditions are determined and artificially communicated to the proper and other place or places.

This practice of the prior art was cumbersome, expensive, required duplication of instruments and personnel at each place with accurate reading, recording and intercommunication of the data from the instruments, besides substantially limiting the extent to which, and the accuracy with which, advance determinations of meteorological conditions may be made.

As a fundamental part of my invention I have discovered that the meteorological conditions prevailing at distant places may be readily determined without the necessity of an instrument or instruments, artificial intercommunication system, and their attendant personnel at and between such places by my method which is first to usefully employ a heretofore useless and meddlesome natural phenomenon, and which employs said phenomenon to naturally obtain and transmit at high velocity and to great distances meteorological data with a celerity, reliability and economy heretofore unattainable through human agencies.

A basic prerequisite of my invention is my discovery of unexpected functions and/or relationships of such phenomenon relative to meteorological conditions; that said phenomenon is caused by and/or exists naturally in degree substantially proportionate to the changes in natural conditions which will in a definite time produce changes in meteorological conditions; that an absence of such phenomenon from given places and directions is indicative of no such changes thereat; that the characteristics of records made of the manifestations of said phenomenon made from a plurality of directions for definite periods of time, with the general knowledge of meteorological matters and usual characteristics, afford quantitative information of the characteristics of natural changes ample to determine the meteorological conditions of more or less distant places and which usually will obtain in a given place or places within a definite time; that said phenomenon naturally produced radio waves of very broad frequency characteristics and of force substantially proportionate to the natural changes leading to meteorological changes; that said naturally produced radio waves were naturally broadcast and receivable upon a radio circuit tuned to avoid as fas as practical interference with artificially produced and broadcast radio waves; that said natural broadcast reception from a plurality of directions be directly and automatically recorded, truly reproducing the characteristics of said natural waves, upon a permanent record artificially correlated with the direction from which the same was received; and that consideration of said record, or records, in the light of my method of meteorology, will enable one skilled in the art to readily, inexpensively and reliably determine the meteorological conditions then prevailing at more or less distant places and to ordinarily ascertain what meteorological changes may occur at the place or places where such records were made and the approximate time of such changes.

The natural phenomenon which has been employed in the prior practice of determining meteorological conditions has been air currents and pressures which are not naturally transmittable substantially from their localities, and hence such changing phenomenon must be ascertained and communicated by human agencies; but my invention employs therefor the phenomenon of static which is caused by and/or exists naturally in the presence of and in degree substantially proportionate to the changes in natural conditions which will definitely produce changes in meteorological conditions. Static is naturally broadcast in radio waves at high velocity over great distances and possesses characteristics substantially proportionate to said changes whereby a consideration of the characteristics of such broadcast reception, associated with the direction from which such reception came, enables the ready, economical, and efficient ascertainment of the meteorological conditions existing at distant places and the like determination of such changed conditions as will definitely ordinarily occur at the place of such reception.

One of the objects of my invention, in its apparatus exemplification of my method, is to provide a practical construction of apparatus which may be employed in correlating static with conditions of the weather for enabling a forecast of weather conditions to be made not only many hours in advance of the actual change of weather conditions at any particular location, but also in advance of predictions made by methods heretofore employed.

Another object of my invention, in its apparatus exemplification of my method, is to provide a practical construction of apparatus for automatically recording the effects of static for determining the direction of the static and permitting a forecast to be made of weather conditions.

Still another object of my invention, in its apparatus exemplification of my method, is to provide an apparatus for locating the movement of storms for the purpose of warning navigators in the air and on water of the approximate position of storm centers, enabling such navigators to lay out a course of travel for avoiding the storms.

A further object of my invention, in its apparatus exemplification of my method, is to provide an apparatus for determining the areas of static belts for determining the communication conditions at distant points for the purpose of forecasting the probable static-to-signal ratio at distant receiving stations with which a particular transmitter is coordinated for operation.

A still further object of my invention, in its apparatus exemplification of my method, is to provide an apparatus for automatically preparing a static chart which enables a forecast to be made of the approximate barometric readings in a particular locality hours before the barometer may there actually drop to the forecasted reading.

Other and further objects of my invention, in its apparatus exemplification of my method, reside in the arrangement of a static recording apparatus for increasing the safety of navigation and increasing the public safety against the losses due to storms, as will be more fully understood from the following specification.

To attain these and other objects, and in accordance with the general features and principles of my unitary invention of related and dependent components, my improved method contemplates the obtaining of data of changes of natural conditions at distant places tending to produce meteorological changes thereat, and the forthwith communication of such data at high velocity throughout great distances each by static; associating the characteristics of static with the characteristics of the changes producing meteorological changes; receiving static manifestations associated with the direction of said receipt; receiving static upon a radio circuit tuned to substantially avoid interference with artificial radio broadcasting; distinguishing between the characteristics of static reception and that of artificial broadcast reception; recording static manifestations definitely receivable from different directions over a substantial period of time and associated with the direction of said receipt; and including other steps as may be made apparent hereinafter and in the appended claims.

To demonstrate the practical utility of my said method a related, improved and novel apparatus embodying my invention is provided herein. Said apparatus may be used advantageously and economically in practicing my improved method as a unitary invention. Said apparatus is also provided in one of its many possible forms hereinafter disclosed to also serve as an example, to those skilled in the art, of the facility with which, after becoming familiar with my invention, the many forms and kinds of existing apparatus, with or without substantial modification, may be employed in the efficient practice of my improved method.

My improved apparatus contemplates and includes a radio reception system tuned so that interference by artificial broadcast may be substantially avoided or minimized; directional antenna means rotatably mounted; a record; a recording means connected to and actuated by said system to record on said record the static reception of said system; and means for relatively rotating said record and said recording means in definite relation to the rotation of said antenna means and associating said static reception and record thereof with the direction from which the same was received. Said and other features of my improved apparatus will more clearly appear in the following specification and appended claims.

My improved method and its exemplifying apparatus may be more fully understood, in each of the several but dependent aspects of method and of apparatus, from the following specification and drawings illustrating one of the many embodiments of my invention in each of its said aspects. In said drawings like characters of reference indicate the same parts.

Figure 3:
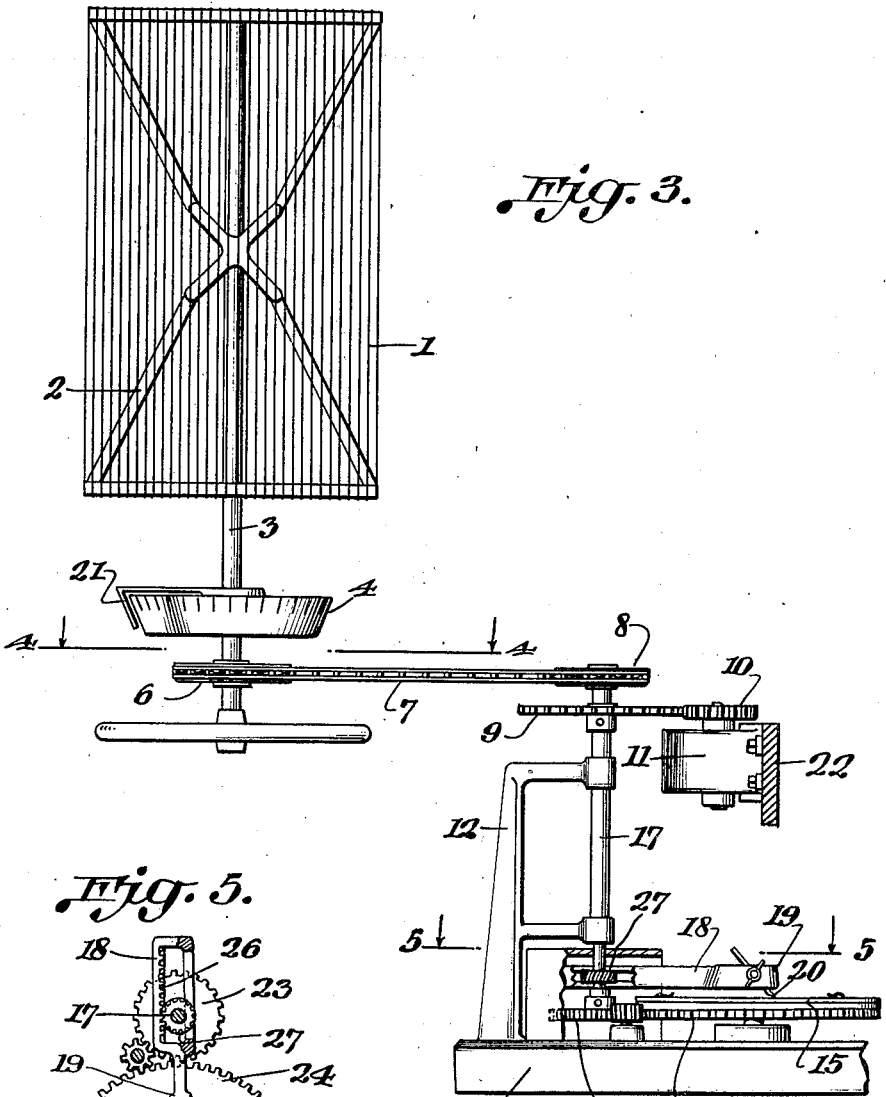
Figure 5:
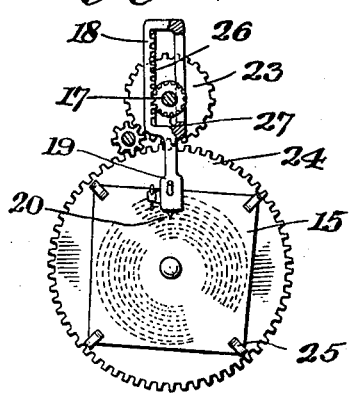
Figure 6:
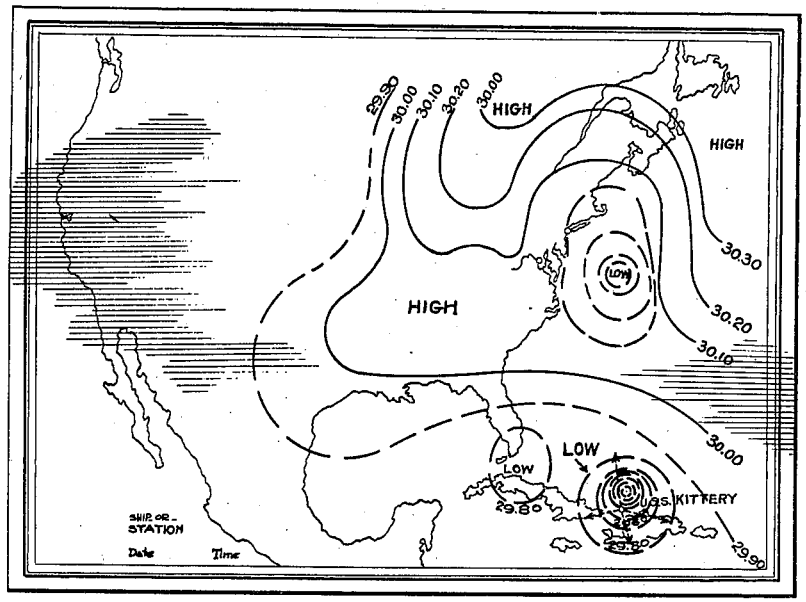
Figure 7:
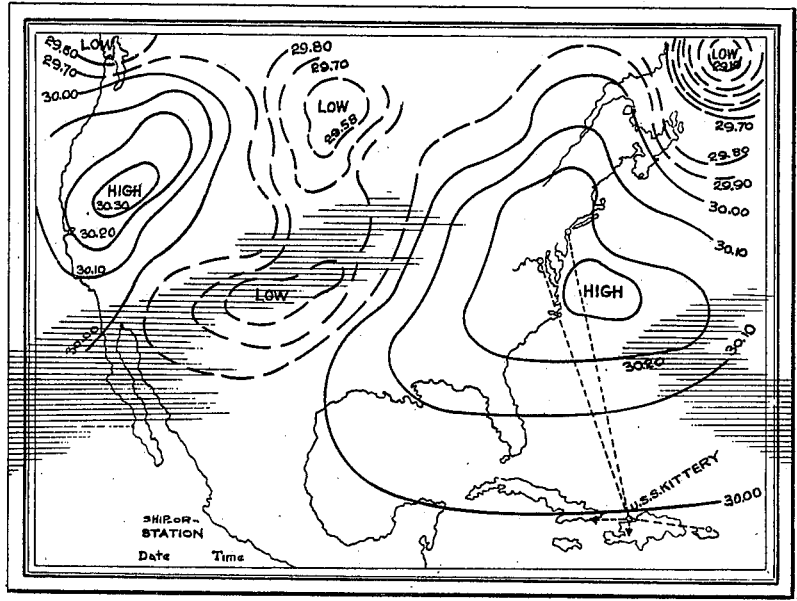
Figure 8:
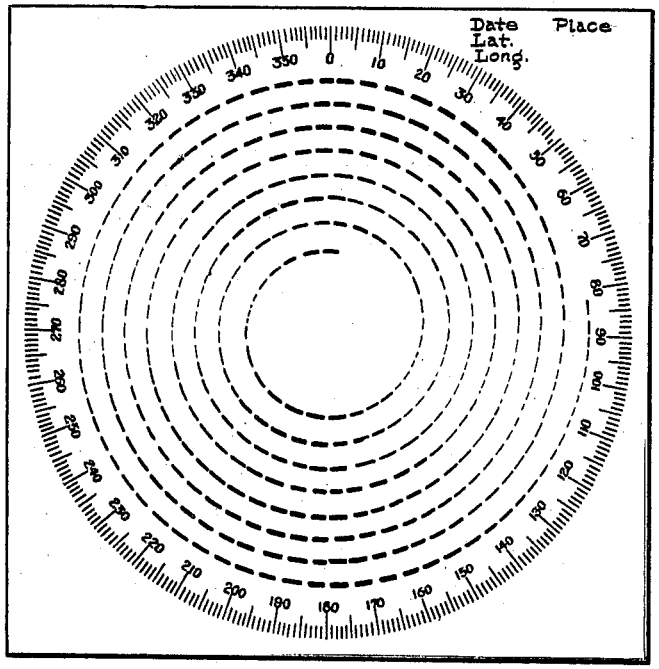
Figure 9:
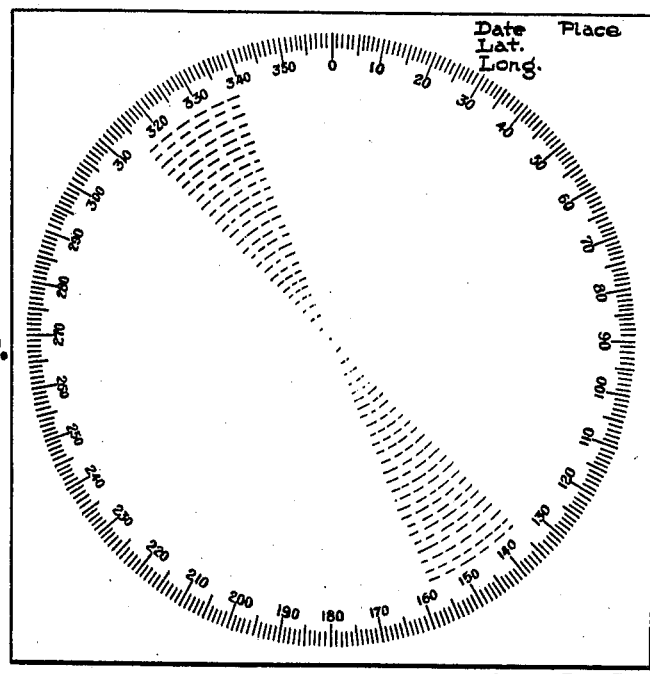
Figure 10:
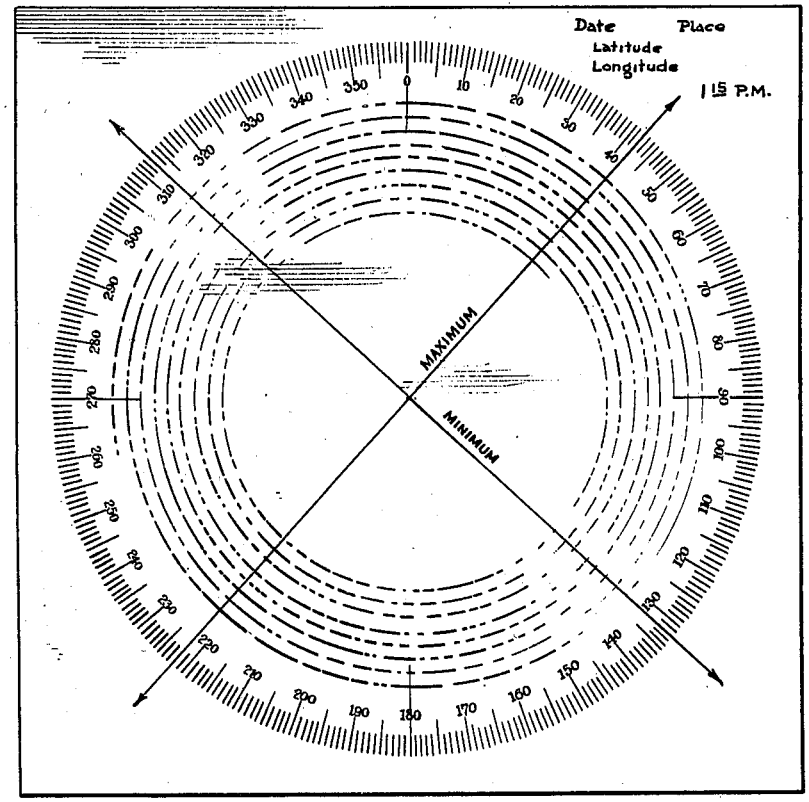

Fig. 1 is a perspective view showing diagrammatically the assembly of the static recording apparatus of my invention; Fig. 2 shows a circuit arrangement of the loop and the static recording apparatus illustrated in Fig. 1; Fig. 3 is a side view of the static recording apparatus of my invention; Fig. 4 is a sectional view taken on line 4—4 of Fig. 3; Fig. 5 is a sectional view taken on line 5—5 of Fig. 3; Fig. 6 is a chart illustrating the conditions of low barometric pressure which exists simultaneously with intense static in different geographical locations; Fig. 7 is a chart showing practically zero static conditions and high barometric pressure existing in the same locality where in Fig. 6 a condition of low barometric pressure and heavy static had existed; Fig. 8 is a plan view of a static record taken at the position of low barometric pressure illustrated in Fig. 6; Fig. 9 is a static record showing the conditions existing at the same locality at high barometric pressure; Fig. 10 is a view of a chart clearly showing a definite minimum taken at Washington, D. C., under the barometric conditions charted in Fig. 11; Fig. 11 illustrates an approaching rain and thundershower belt, the location of which is determinable by means of the static recorder of my invention; and Fig. 12 illustrates how a shift of the maximum static may occur and be detected on the static recorder.

I have discovered and studied the definite relationship of static disturbances with respect to the condition of the atmosphere and to facilitate such observations have used the facilities of the U. S. S. *Kittery* of the United States Navy, employing apparatus, as set forth in the following specification, to automatically plot a static record for enabling a forecast to be made of weather conditions. A definite relationship has been established by me between atmospheric conditions or change of such conditions and static. A condition of low barometric or stormy weather is accompanied by heavy atmospheric disturbances or static. Conversely, a condition of high barometric pressure is accompanied by a relatively clear condition of static.

Observations aboard the U. S. S. *Kittery* located off the coast of Cuba have shown that with a condition of low barometric pressure existing between the U. S. S. *Kittery* and the United States Naval Radio Station at Arlington, Virginia, static was found so intense that artificial signal reception aboard the U. S. S. *Kittery* was impractical. Such static disturbance was followed by the arrival of a low or falling barometer and a storm. Inasmuch as high barometric pressures north of the tropics drift consistently from west to east across the United States, it has been observed that similar conditions of the atmosphere also follow the westward to eastward drift and by checking the conditions of static carefully the arrival of the low and changing pressure on the barometer can be forecasted.

I have discovered and observed that the intensity of the static is approximately proportional to the intensity of changes of atmospheric conditions normally producing storm disturbances, that is the pressure gradient and the rate of change of pressure are approximately proportional to the accompanying static condition. Improved signal reception follows the passage of such depressions, and this has been clearly observed by me on the U. S. S. *Kittery*, off the coast of Cuba with respect to the Arlington Radio Station, when a storm center passed between the two points and the static became less, with a constant rise in pressure on the barometer. Static was found by me to be substantially negligible in an area where the high pressure was a large active one with rather evenly formed isobars showing an even pressure distribution.

These and other observations which have been made by me lead to the conclusion that static is either directly or indirectly due to the atmospheric consequences of pressure gradients. The active high pressures yield relatively no static, and the centers of the intense low pressures are attended by proportionally heavy static.

I have discovered that automatic recorders may be arranged to usefully employ static as a means of forecasting conditions of weather. In the utilization of said discovery I have for the first time in the meteorological art put to an extremely valuable use what has heretofore been considered a mere wasteful nuisance with respect to artificial radio broadcast reception. While it is true that static disturbances are undesirable in radio communications systems and cause interference to entertainment reception in radio broadcasting, nevertheless with my invention static becomes an extremely valuable asset in enabling the prediction of weather conditions for increasing public safety and for the protection of property and guidance of navigators who might otherwise blindly plot a course directly into a hidden storm.

In the apparatus exemplification of the method portion of my invention I provide a radio frequency energy collecting apparatus in the form of a loop which is connected to a continuous wave receiving apparatus and to a pen actuated recorder. The recorder includes a rotatably mounted record table upon which a card record is removably arranged beneath the pen recorder. The card record and the loop are rotatably driven in synchronism enabling static energy to be received successively from different directions over an extended time interval within the capacity of such card record. The static impulses are arranged to trip the pen recorder for effecting a written record upon the card record in accordance with the received impulses. By continuing the card record over a predetermined time interval a chart may be obtained indicating directions free of static and indicating directions in which static may exist.

As more fully described hereinafter the chart thus obtained enables the navigator to determine the direction of low barometric pressures with accompanying storm centers and conveys to the navigator information necessary to plot a course in which he will safely escape the storm areas.

Referring to the drawings in more detail, reference character 1 designates a loop antenna having the turns thereof supported by frame structure 2 which may be rotated by a shaft 3. A dial 4 is shown carried by shaft 3 with stationary indicia represented at 21 for indicating the movement of loop antenna 1. A hand wheel 5 is provided for manually moving the loop antenna 1. A sprocket 6 is secured to shaft 3 over which the chain or belt 7 operates. The chain or belt 7 engages the sprocket 8 secured upon shaft 17 and journaled in a suitable bearing support 12. A drive gear 9 is carried by shaft 17 which is engaged by pinion 10 driven from motor 11. The motor 11 is supported from the bracket 22 and is energized from any suitable source for constantly rotating the loop antenna 1. The shaft 17 carries a pinion 27 thereon which meshes with a rack 26 formed on arm 18 which extends laterally over the base 14 and over the record card 15. The arm 18 is provided with rigid bars 18a adapted to contact with shaft 17 and the upper and lower surfaces of gear 27, Figs. 3, 5. Said contacts of rack 26 with gear 27 and of bars 18a with shaft 17 and gear 27 guide one end of arm 18, while the slot 18b, Figs. 1, 3, in housing 18c, contacting with the intermediate portion of arm 18 guides arm 18 in its longitudinal movement occasioned by the rotation of gear 27 meshing with the rack 26 portion of arm 18. Said longitudinal movement of arm 18 being in definite relation to the rotation of the record card 15 permits the pen 20 of arm 18 to mark card 15 in the form of a helix as indicated in Figs. 5, 8, 9 and 10. The record card 15 is mounted by clamps 25 upon a record table 24 which is geared to rotate simultaneously with shaft 17 in mesh directly or through idler 23a with gear 23 carried by the shaft 17. Each record card 15 is provided with a row of indications 15a, Figs. 8, 9, 10, preferably in degrees conforming to the indications on indicator 4 revoluble with shaft 3, Figs. 1 and 3. The clamps 25 facilitate the mounting on table 24 of card 15 such that the similar character indicated by indices 21 on indicator 4 is in radial alignment with the position of pen 20, whereby the card 15 and antenna 1 are conveniently coordinated. The arm 18 carries the magnetic writer 19 having pen 20 which is arranged to place a mark upon the card record 15 upon the reception of each static impulse which may be received on loop antenna 1. The signal receiving apparatus is connected through leads 55 with loop antenna 1 and is shown diagrammatically in Fig. 1 by reference character 54.

Referring to Fig. 2 the receiving apparatus comprises a tuning system 30, radio frequency amplifier stages 31—32—33 coupled by means of transformers 31a, 32a and 33a, a detector 34 coupled by means of transformer 34a with an audio frequency amplification system represented as constituted by stages 35 and 36 coupled by transformer systems 35a and 36a. A power amplifier stage is provided at 37 for impressing static impulses upon the differential recorder circuit constituted by power tubes 38 and 39. Separate coupling transformers 41 and 42 are connected between the output circuit of the stage of power amplification at 37 and the input circuit of the differential recorder. A source of potential is shown at 46 for the plate circuit of the power amplifier system 37. A source of potential is shown at 45 for the output circuit of the differential recorder constituted by tubes 38 and 39. The pen recorder has been represented diagrammatically at 19 as having its windings connected in series in the output circuit and shunted by means of condenser 44. An armature is arranged to cooperate with the winding 19 for moving the pen 20 toward or away from the card record in establishing the written record on the card. Ammeter 43 is arranged in the output circuit for observing the amplitude of the static disturbances. Proper control of the biasing voltage on the grid circuits of the differential recorder system is obtained from the source 47 under control of potentiometer 48. A local oscillator 40 having its input and output circuits coupled as represented at 49 is arranged in the receiving system for securing proper resonance of the differential recorder system to the static disturbances. I have found that without said control of the resonance of said recorder system the records of the static disturbances, which are received on the antenna at substantially all frequencies, are not as definite and do not as truly reproduce on the record card 15 the actual static reception as with and through said control; and that when receiving and/or recording static without said control of the resonance of the ultimate receiving or recording system more meteorologically expert and experienced consideration of the resulting static manifestations was required to correctly interpret the same than was necessary with the employment of said control. A high potential source 50 is shown for energizing the oscillator circuit. The cathodes for each of the tubes are energized from battery system 52 under control of rheostat 51.

In Fig. 6 I have shown the geographic location of the U. S. S. *Kittery* off the coast of Cuba with a condition of heavy static existing, and correspondingly a condition of low barometric pressure rendering radio communication impractical. The approach of the condition of low barometric pressure to the locality of the U. S. S. *Kittery* was forecasted many hours in advance of the fall of the barometer on said vessel by observations there taken with the method and apparatus of my invention.

In Fig. 7 I have shown a condition where the static recorder shows practically no response and communication conditions excellent with the barometer remaining high. A condition such as this is readily forecasted on the chart made on the static recording apparatus.

In Fig. 8 I have shown the appearance of a chart taken under the conditions illustrated in Fig. 6 where static exists in all directions over the chart 15, but predominating in the general direction intermediate the lighter areas of said chart.

In Fig. 9 I have shown a chart practically clear of static disturbances but representing the approach of a low barometric pressure from the northwest and that the center of such low pressure area is in a line of position extending through the center of the areas recorded on record chart 15, as is indicated in Fig. 7. The common knowledge of the time and place or places of making such record and the well known usual paths and directions of storms in different seasons enable the ready ascertainment that said direction is northwest instead of southeast. Said information also enables the ready determination of whether or not said pressure area is approaching the recording point or points, which direction of travel is confirmed by the characteristics of the record on chart 15 as to whether the earlier or later made records on chart 15 are progressively heavier or lighter during the protracted interval of time required to record the chart 15 to its full, or any lesser desired, capacity. The known time required for such record chart 15 considered with the rate of progression of the heavier or lighter made records on chart 15 afford definite data for the ready determination of the rate of travel of such area.

In Fig. 10 a chart obtained under the conditions of Fig. 11 has been illustrated showing how the two maxima and two minima are clearly visible. The increased pressure of the ink writer on the chart is clearly illustrated in the maximum static direction, while the pen record substantially disappears in the minimum directions. Charts other than indicated in Fig. 10, were made at the point of intersection of said radial lines at the different times marked adjacent said lines and the line of position of maximum static on said charts conformed to their respective radial lines, and which charts and radial lines on Fig. 11, indicate the shift of the bearing of the low area of Fig. 11 and its maximum static from noon to 8:00 P. M. The assumption is that the southerly of the bilateral bearing is the true maximum, said assumption being in the light afforded by the common knowledge indicated in connection with the next preceding description of Fig. 9.

Figs. 11 and 12 show charts constructed from the static observations taken with the static recording apparatus located at the U. S. Naval Research Laboratory, Bellevue, Washington, D. C., where the observations taken aboard the U. S. S. *Kittery* were checked and compared. The radiating arrows of Figs. 11 and 12 indicate the lines of position which would pass through the center of the low area productive of maximum static at the times indicated in connection with each of said arrows.

The checking and comparison affordable by such two or more widely separated static observing and recording stations affords a plurality of substantially different angled lines of position from the static maximum and minimum records. Said different angled lines of position afford a ready and dependable check upon each bilateral bearing by the triangulation of the static source with respect to the points of location of the different receiving and recording stations. The known locations of the plurality of receiving and recording stations, and comparisons of concurrent records made at each such location, also enables ready accurate determinations of the location and distance of the source of the maximum and minimum static disturbances, their direction and rate of travel, as a dependable check upon and supplement to the information affordable by each separate concurrent record.

The mechanism of the static recording apparatus is such that the loop antenna and the record card are simultaneously driven over an extended interval, each revolution being made in a period of several minutes. Upon the completion of each complete revolution or continuously, the ink writer is advanced, thereby enabling the pen 20 to have a clear space upon which to write a continuous record on the card. The record thus made is in the form of concentric circles or a spiral many of which are recordable upon one record card 15. As the loop antenna revolves to each position from which static disturbances are not being received, no record is made by the ink writer upon the card, and until the loop antenna reaches a position each time during the course of its revolution which by directive reception will give a response to a perhaps distant static disturbance there will be no record impressed upon the card. The static disturbances which are coming from a particular direction will actuate the writer each time the loop is revolved to that particular plane or direction, so that the result is a card record having a series of marks each characteristic of its particular disturbance. The recorded areas on the record card 15 will be disposed on opposite sides of the center of said card 15. Through the center of rotation of said card and the centers of said recorded areas a line of position may be drawn upon the recorded card 15. Upon an extension of said line will lie the average center, for the period required for the completion of the record card 15, of the approaching low barometric pressure condition which occasioned or was accompanied by the static disturbances which resulted in said recorded areas. High barometric areas produce or are accompanied by little, if any appreciable, static which results in no, or faint, marks being recorded on the record card 15 in areas on opposite sides of the center of said card. Through the center of rotation of said card and the centers of said light or no record areas, a line of position may be drawn upon the recorded card 15. Upon an extension of said line will line the average center, for the period required for the completion of the record card 15, of the high barometric pressure area. By these observations the direction of and other matters pertaining to, or associated with, high and low barometric pressures can be predicted.

My invention enables a prophetic observation to be made independent of barometric readings enabling the observer to secure barometric information of what may be the approaching weather condition. Radio communication centers may use this information in prophesying what the conditions of reception may be at the distant point to which communications are being transmitted. For instance, a navigator at sea or in the air may utilize the records thus taken from the static for maintaining the course of the vessel away from storm centers. Lighter than air craft are especially liable to vital injury or destruction from static as well as storm areas and hence it is important that such craft avoid the same.

My invention has many applications in the increase of safety of life and the preservation of property, and while I have described a preferred embodiment of the apparatus of my invention, I desire that it be understood that modifications may be made and that no limitations upon my invention are intended other than are imposed by the scope of the appended claims.

The invention herein described may be manufactured and used by or for the Government of the United States for governmental purposes without the payment to me of any royalty thereon or therefor.

What I claim as new and desire to secure by Letters Patent of the United States is as follows:

1. In a system of meteorological observation a radio receiving apparatus, a directive antenna connected with said radio receiving apparatus, a recording device connected with said radio receiving apparatus for actuation by static impulses incident upon said directive antenna, a record sheet arranged adjacent said recording device, and means for simultaneously moving said directive antenna and said record sheet for recording successive records of static impulses upon said record sheet.

2. In an apparatus for correlating static with changes in the condition of the weather, a loop antenna, an apparatus for supporting a record card, means for synchronously rotating said loop antenna and said card, static receiving apparatus connected with said loop antenna, a recording device located adjacent said card and actuated by said static receiving apparatus for recording the successive strength or amplitude of static intensities in various directions of the compass simultaneously with the rotation of said loop antenna.

3. A meteorological device for receiving static impulses comprising a loop antenna, a receiving circuit connected therewith, a recording device controlled by said receiving circuit, a record table located adjacent said recording device, means for synchronously rotating said loop antenna and said record table, a chart carried by said record table for receiving a record of the strength or amplitude of static intensities in successively different directions in accordance with the rotation of said loop antenna, and means for shifting said recording device with respect to said chart during each revolution of said loop antenna for securing a static record on said chart substantially in the form of a spiral.

4. In an apparatus for ascertaining certain meteorological conditions of distant places, a loop antenna, a static receiving system connected with said loop antenna, a recording device actuated by said receiving system, a record table, a chart carried by said record table adjacent said recording device, means for simultaneously rotating said record table and said loop antenna for securing upon said chart an indication of static existent in the same relative direction as received by said antenna as it rotated, and means for shifting said recording device to a different position with respect to said chart upon the completion of each revolution of said loop antenna.

5. In a looped antenna static receiving apparatus for the meteorological art, a recording device controlled by said static receiving apparatus, a chart rotatable adjacent said recording device, and means for impressing an indicative mark of static disturbances upon said chart in a direction on said chart corresponding to the plane of said loop antenna for indicating the strength or amplitude of static intensities in various directions of the compass.

6. In a device for ascertaining certain meteorological conditions of distant places by indicating the presence and direction of electrical disturbances, the combination of a directional antenna for collecting energy from said disturbances, an amplifier coupled to said directive antenna, and means for recording the relative position of said antenna about its axis and the relative intensity of the current flowing in said amplifier when actuated by said collected energy.

7. In the method of determining certain meterological conditions in a given direction from a given point, the steps of receiving the characteristics of successive manifestations of electrical energy naturally transmitted to said point from said direction, and intermittently recording about a central point graphically on a chart during a substantial period of time a record of the characteristics of said received energy correlated with the direction from which the same was received.

8. The method of ascertaining certain meteorological conditions of a distant place or places, including the step of graphically recording a record of the characteristics, correlated with the direction of its receipt, of static transmitted from such place or places.

9. The method of ascertaining certain meteorological conditions of a distant place or places, including the step of intermittently throughout a substantial period of time graphically recording representations of the characteristics of static impulses spaced about the center of a record corresponding to the direction from which were received the static naturally transmitted from the region of such place or places.

10. The method of determining certain meteorological conditions including the steps of receiving natural electrical energy upon a radio circuit tuned to substantially eliminate artificial signals, thence imparting said energy to a recorder circuit, and controlling the resonance of said recorder circuit.

11. The method of determining certain meteorological conditions including the steps of directionally receiving natural electrical energy, communicating said energy to a radio circuit tuned to substantially eliminate artificial signals, thence imparting said energy to a recorder circuit, controlling the resonance of said recorder circuit, and making a record of said controlled energy in said recorder circuit correlated with the direction from which said energy was received.

12. In a recorder for electric energy, a directional antenna, a recording table adapted to support a record chart, means for rotatably mounting said antenna and table, means movable across said table, recording means mounted on said last named means and adapted to mark upon said record chart, means for synchronously driving said means for mounting said antenna and table together and said means movable across said table a relatively small space for each revolution of said table, and means for receiving electric energy from said antenna and operating said recording means characteristically of said received energy.

13. In a meteorological static recorder, means adapted to support a record receiving member, a record receiving member bearing directional indicia, means including a directional antenna for receiving and directionally recording upon said receiving member graphic characteristics of static disturbances, said second named means including a radio receiving apparatus of the beat note type, and means for maintaining the directional relation of said member to said second named means.

14. The method of ascertaining certain meteorological conditions which prevail at a distant place or places, which includes receiving from said distant place or places naturally transmitted natural phenomena associated with such conditions, and recording the characteristics and direction of said phenomena which indicate the intensities and direction of change of the center of the intensities of said conditions prevailing at said distant place or places.

15. In a recorder for naturally transmitted static energy for the determination of certain meteorological conditions, the combination of a directional antenna, a record disc, means for rotating said disc and antenna in unison, means indicating the compass directions of said rotating elements, recording means mounted adjacent to the face of said record disc, means for moving said recording means radially over the face of said record disc at a rate relative to the rotation of said disc, a record receiving element bearing indicia of compass directions, means for removably securing said record securing element to said record disc in the same compass bearing relative to the recording element of said recording means as is indicated by said indicating means, and radio-electric means receiving and conveying static impulses from the antenna to said recording means and actuating said recording means to make a graphic record on said record receiving element in progressive circles of the characteristics of the static received throughout a substantial period.

16. The method of manipulation in determining certain meteorological conditions with a radio receiver, an antenna and with a recorder and record chart; comprising synchronously moving the record and antenna about a central point and the recorder relative to the center of the record chart while directionally receiving static on the radio receiver, and graphically recording in substantially a spiral on the record chart correlated to the direction of its receipt the characteristics of said received static.

17. The method of manipulation in determining certain meteorological conditions with a radio receiver detuned to artificial signals and an antenna, a recorder and a record chart; comprising moving the antenna and relatively moving the recorder and record charts synchronously while the radio receiver is actuating the recorder, to graphically record intermittently about a central point on the record chart characteristics of static received from different directions.

EARLE H. KINCAID.